(12) United States Patent
Malin

(10) Patent No.: US 11,817,691 B2
(45) Date of Patent: Nov. 14, 2023

(54) POLE STRINGING BRACKET DEVICE AND METHOD OF USE

(71) Applicant: Allied Bolt, Inc., Lake Success, NY (US)

(72) Inventor: Glen K. Malin, Lake Success, NY (US)

(73) Assignee: Allied Bolt, Inc., Lake Success, NY (US)

( * ) Notice: Subject to any disclaimer, the term of this patent is extended or adjusted under 35 U.S.C. 154(b) by 466 days.

(21) Appl. No.: 17/128,928

(22) Filed: Dec. 21, 2020

(65) Prior Publication Data
US 2022/0200258 A1  Jun. 23, 2022

(51) Int. Cl.
*H02G 7/00* (2006.01)
*H02G 7/05* (2006.01)

(52) U.S. Cl.
CPC .................................. *H02G 7/053* (2013.01)

(58) Field of Classification Search
CPC ............ H02G 7/053; H02G 7/00; H02G 7/02; H02G 7/04; H02G 7/05; H02G 7/06; H02G 7/12; H02G 7/205; H02G 1/04
USPC ........ 174/40 CC, 40 R, 43, 45 R, 68.1, 68.3, 174/70 C, 70 A; 248/74.1, 74.2, 200, 248/68.1, 49, 62, 63, 65; 385/134, 135
See application file for complete search history.

(56) References Cited

U.S. PATENT DOCUMENTS

| | | | | |
|---|---|---|---|---|
| 3,019,282 A | * | 1/1962 | Husted | H02G 7/056 174/146 |
| 3,176,944 A | * | 4/1965 | Crates | F16G 11/146 248/62 |
| 3,957,238 A | * | 5/1976 | Bourrieres | H02G 7/20 174/149 R |
| 3,958,784 A | * | 5/1976 | Bourrieres | H02G 7/053 248/303 |
| 4,117,256 A | * | 9/1978 | Williams | H02G 7/056 174/40 R |
| 5,087,002 A | * | 2/1992 | Okura | H02G 7/056 248/65 |
| 6,201,184 B1 | * | 3/2001 | Francois et al. | H02G 7/053 174/41 |
| 6,581,251 B2 | | 6/2003 | Malin | |
| 8,516,317 B2 | | 8/2013 | Nadeau-dostie et al. | |
| 9,010,695 B2 | * | 4/2015 | Efraimsson | H02G 7/053 248/65 |
| 9,645,343 B2 | * | 5/2017 | Miller | G02B 6/4471 |
| 10,355,467 B1 | * | 7/2019 | Conrad | H02G 7/205 |

(Continued)

*Primary Examiner* — Angel R Estrada
(74) *Attorney, Agent, or Firm* — Baker Botts L.L.P.

(57) ABSTRACT

A bracket device to secure one or more tail wires of one or more drop clamps to a utility pole. The bracket device includes one or more support ribs extending perpendicularly from the bracket base, and attached to one or more side supports. The support ribs and side supports define one or more retention regions along the side of the bracket based. A plurality of securing bolts can be cooperatively coupled to the side supports and define secondary retention regions. The securing bolts may be moved between an open position and a closed position. The bracket device can further comprise a top loop, which extends from the bracket base, and which can be coupled to additional wires. The bracket device can be secured to a utility pole or similar structure by a single fastening component, which is configured to pass through the cavity of the bracket base.

19 Claims, 10 Drawing Sheets

(56) References Cited

U.S. PATENT DOCUMENTS

| | | | |
|---|---|---|---|
| 10,697,516 B2* | 6/2020 | Malin | F16G 11/14 |
| 10,971,915 B2* | 4/2021 | Smith | H02G 7/056 |
| 11,569,648 B2* | 1/2023 | Sailer | H02G 7/053 |
| 2021/0149139 A1* | 5/2021 | Berry | G02B 6/443 |

* cited by examiner

POLE STRINGING BRACKET DEVICE AND METHOD OF USE

BACKGROUND

Field of the Disclosed Subject Matter

The disclosed subject matter relates to devices and methods to secure brackets and one or more wires to a utility pole or similar structure.

Description of the Related Art

Bracket devices are commonly used in conjunction with drop wire clamps or wire deadends to secure telecommunications wires and similar components to utility poles, which can be composed of a variety of materials, including, for example, wood, concrete, and fiberglass. These devices can be used to secure, for example, telephone cables, fiber optic cables, television cables, network cables and similar to utility poles and other round structures. Bracket devices can be used to secure wires with drop wire clamps or wire deadends at an intermediate portion thereof to a point on a selected structure. For example, certain bracket devices or suspension hooks can be used to secure wires, by supporting drop wire clamps or wire deadends to intermediate utility poles, which can extend the useful range of the wire systems.

Such bracket devices are known in the art. Certain bracket devices are designed to cooperate with clamps, such as the drop wire clamps disclosed in U.S. Pat. Nos. 6,581,251 and 8,516,317, the disclosures of which are herein incorporated by reference in their entireties. Some known bracket devices, however, have deficiencies. For example, certain traditional bracket devices can only accommodate a single type of clamp device or tail wire, requiring multiple brackets to secure multiple wires and drop wire clamps to a utility pole. In addition, the cost of installing brackets on structures is calculated based on the number of fastening components (for example, bolts, screws, bands, or straps) used to secure the bracket to the utility pole. Further, the use of multiple bracket devices, or devices which require multiple fastening components can also require the installer to pay the owner of the pole for the increased space occupied on the utility pole. Some utility poles also have limited space available and cannot accommodate more than one bracket device, which limits the ability of installers to use such utility poles as intermediaries.

According, there exists a need in the art for an improved bracket device that overcomes at least the above-identified issues.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages, the disclosed subject matter provides bracket devices to secure a plurality of drop wire clamps and/or wire deadends to a utility pole, and which are compatible with a wide variety of drop wire clamps and wire deadends. In an exemplary embodiment, a bracket device includes a base having a surface and a cavity. The bracket device further includes one or more support ribs which can extend perpendicularly from the bracket base, and attached to one or more side supports. These support ribs and side supports define one or more retention regions along the side of the bracket base.

The side supports can provide a variety of functionalities to the exemplary bracket devices. These functionalities are explained below, and illustrated in the accompanying figures, but should not be considered limiting. A person of ordinary skill in the art will recognize a number of possible uses for the side supports, which can be in the form of essentially vertical poles, attached to the bracket base by one or more support ribs. In certain embodiments, the side supports define retention regions into which the tail wires of drop wire clamps may be inserted. In other exemplary embodiments, the retention regions may also accept and retain wire deadends of wire runs. Exemplary bracket devices can retain one or more of both tail wires and wire deadends, and use of one does not preclude use of the other in the disclosed devices.

A plurality of securing bolts can be cooperatively coupled to the side supports and define secondary retention regions. The securing bolts can also be configured to be moved between an open position, which permits a portion of the drop wire clamp or wire deadend to enter the secondary retention regions and a closed position, which retains a portion of the drop wire clamp or wire deadend in the secondary retention region. The bracket device can further include a top loop, which extends from the bracket base, and which can be coupled with drop wire clamps whose tail wires can open and close to accommodate additional wires. In addition to coupling one or more drop wire clamps to the bracket device, the disclosed subject matter provides a suspension hook which can be secured to the bracket device, either alone or in combination with a suspension clamp.

The bracket device can be secured to a utility pole in multiple ways, depending on the installer's needs. In certain embodiments, for example, when securing the bracket device to a wooden utility pole, the bracket device can be secured by a single securing bolt, which is configured to pass through the cavity of the bracket base. In alternative embodiments, for example and not limitation, when securing the bracket device to a concrete or fiberglass utility pole, the bracket device can be secured using a fastener, preferably a band that passes through one or more slots of the bracket device and around the utility pole. While in certain preferred embodiments, this fastener is a band, other fastening devices are also contemplated which can achieve a similar effect, for example, and not limitation a strap, a cable tie, and similar fasteners may be used to secure the bracket device. In certain embodiments, the bracket device may comprise up to three slots through which one or more fasteners pass.

The disclosed subject matter also provides methods for securing drop wire clamps to a utility pole using a bracket device as described. In an example embodiment, a method includes attaching the bracket device to a utility pole using a single securing bolt and coupling at least one drop wire to a retention region on the bracket device. In alternative embodiments, the method can include attaching the bracket device to a utility pole using a fastener (for example a band) and coupling at least one drop wire to a retention region on the bracket device. The method further includes coupling additional subsequent drop wire clamps to either the first retention region or secondary retention regions located on the bracket device. The method can further include moving a plurality of securing bolts, which define secondary retention regions, between an open position, allowing tail wires and/or wire deadends to be inserted into the retention region, and a closed position, which retains tail wires and/or wire deadends in the secondary retention regions.

It is to be understood that both the foregoing general description and the following detailed description are exemplary and are intended to provide further explanation of the disclosed subject matter claimed.

BRIEF DESCRIPTION OF THE DRAWINGS

The subject matter of the application will be more readily understood from the following detailed description when read in conjunction with the accompanying drawings, in which.

DETAILED DESCRIPTION

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description herein.

The techniques presented herein can be used for securing a wide variety of drop wire clamps, wire deadends, and tail wires to a utility pole, or similar structures. The disclosed subject matter is suited for securing multiple utility drop wire clamps and/or wires simultaneously or separately, including, but not limited to, fiber optic wires, to utility poles and similar structures. A variety of drop wire clamps are contemplated as being used with the bracket device of the disclosed subject matter, including, for example but not limitation, paired drop wire clamps, wire deadends, closed loop drop wire clamps, open loop drop wire clamps and suspension clamps. These exemplary components are provided for illustrative purposes only, and are not meant to limit the scope of the disclosed subject matter. Persons of ordinary skill in the art will recognize a wide range of appropriate components which can be coupled to the disclosed bracket device.

The bracket devices and methods of the disclosed subject matter have demonstrated desired performance characteristics not achieved by certain conventional bracket devices. For the purpose of understanding, and not limitation, bracket devices according to the disclosed subject matter are able to secure multiple different types of cables, drop clamps, and other utility devices to a utility pole or similar structure. In addition, the bracket device itself can be secured to a structure using only a single securing bolt or a single fastener, such as a band or strap.

The accompanying figures, where like reference numbers refer to identical or functionally similar elements throughout the separate view, serve to further illustrate various embodiments and to explain various principles and advantages all in accordance with the disclosed subject matter. For the purpose of explanation and illustration, not limitation, exemplary embodiments of the bracket device and accompanying components in accordance with the disclosed subject matter are shown in FIGS. 1-13.

Figure 1:
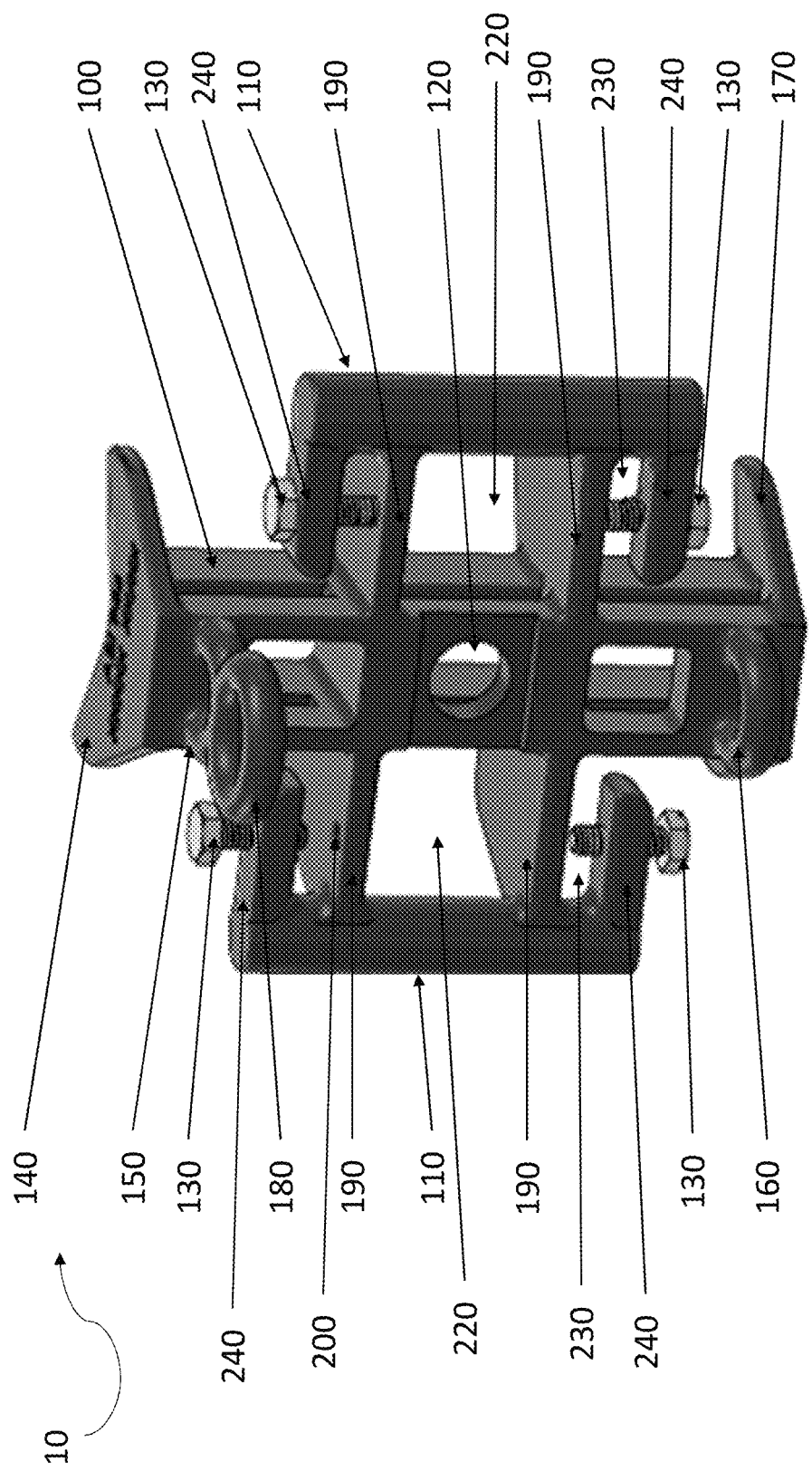
FIG. 1 is a perspective front view of an exemplary embodiment of a bracket device in accordance with the disclosed subject matter that can be secured to a structure with a single bolt.
Figure 2:
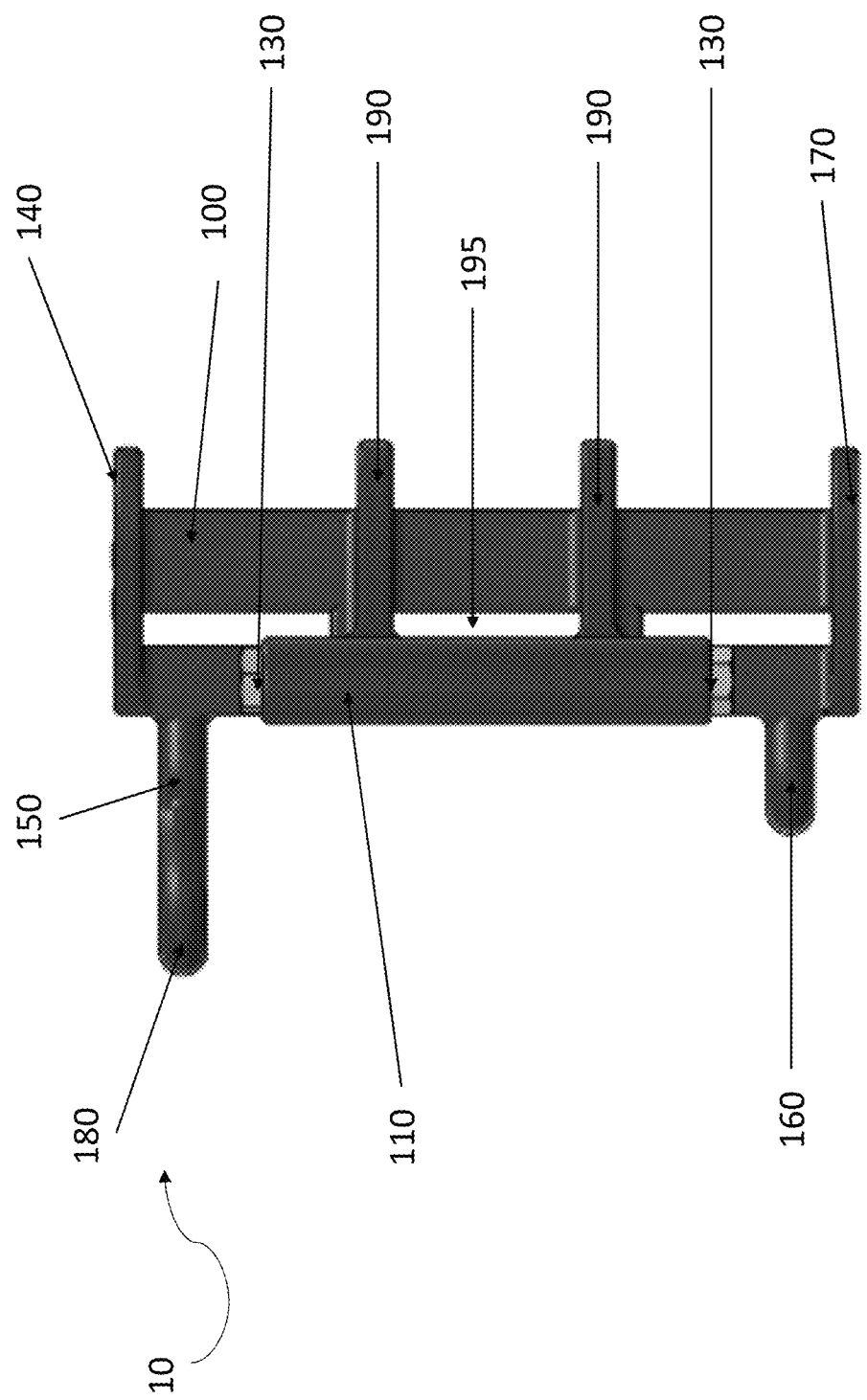
FIG. 2 is a side view of the bracket device of FIG. 1.
Figure 3:
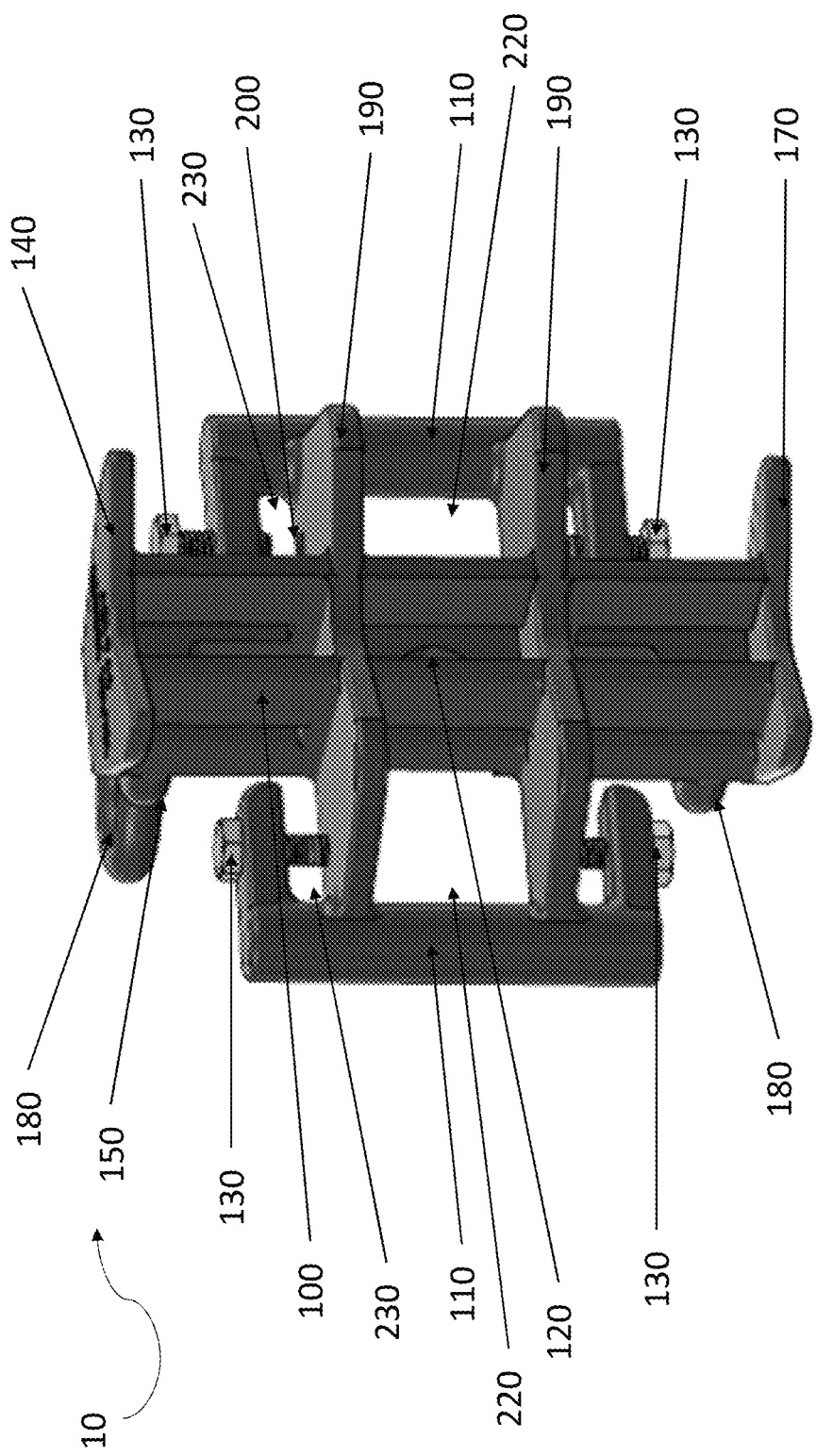
FIG. 3 is a perspective rear view of the bracket device of FIG. 1.

For the purpose of illustration and not limitation, reference is made to the exemplary embodiment of a bracket device shown in FIGS. 1-4. As shown in FIGS. 1, 2, and 3 the bracket device 10 generally includes a base 100 including a cavity 120, which traverses the base. As seen in FIGS. 1 and 2, the cavity 120 can be in the form of a hole, which goes through the base 100. As embodied herein, the base 100, can further include one or more support ribs 190 which can extend perpendicularly to the base 100 in an essentially lateral direction. Further side supports 110, which can, for example, attach to the support ribs and extend parallel to the support ribs 190, define at least one retention region 220 of the base 100. This retention region 220 may be defined, for example, by the base 100 on a first side, a side support 110 on a second side, and support ribs 190 on a third and fourth side.

The side supports 110 may further include one or more projections 240 which extend towards the base 100 and originate at a point on the side support 110 located above or below the support rib 190 to which the side support 110 is attached. Projections 240 may further include a hole into which a securing bolt 130 is inserted, oriented so that the securing bolt 130 is inserted in the direction of the support rib 190 to which the side support 110 is attached. Although in the embodiments disclosed in FIGS. 1-4, the projections 240 extend perpendicular to the side support 110, other angles and orientations are contemplated. For example, the projections 240 may extend toward the base 100 at angles greater than or less than ninety degrees. Additionally, in certain embodiments, the side supports 110 may not contain projections 240. Rather, the side supports 110 may contain a hole, or similar, located above or below the support rib 190 to which the side support 110 is attached. Through this hole, a securing bolt 130 may be inserted, which in this exemplary embodiment would be inserted towards the base 100 of the bracket device 10. Once inserted into the side support 110, the securing bolt 130 can form a secondary retention region 230 defined by the support rib 190, side support 110, the projection 240, and the securing bolt 130.

Once inserted into the side support 110, the securing bolt 130 may be moved between an open position and a closed position. This movement can be achieved in a variety of way. For example, and not limitation, the securing bolt 130 may be screwed into the side support. When in an open position, the securing bolt 130 can leave a gap between the end of the securing bolt 130 and the support rib 190 (or base 100, if the embodiment does not use perpendicular projections).

Figure 5B:
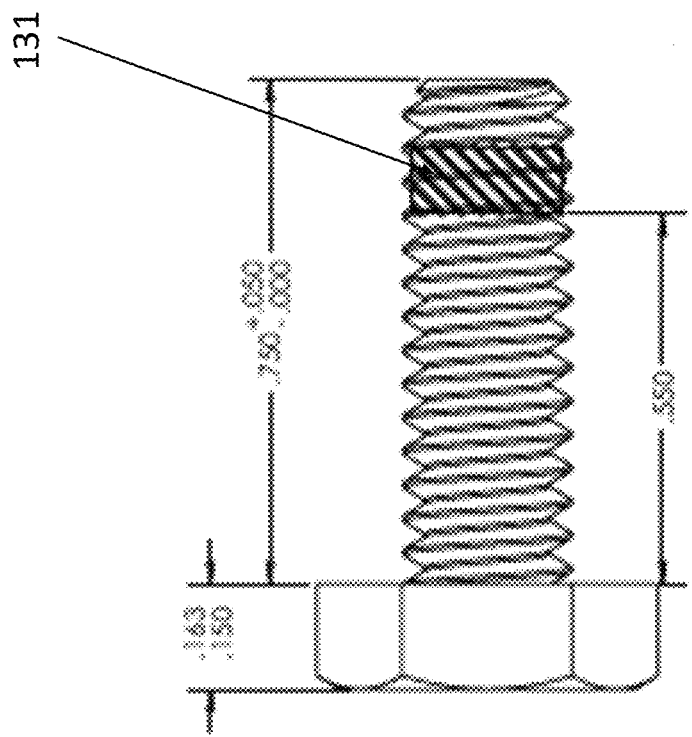
FIG. 5b is a side view of a bolt according to FIG. 5a, including an exemplary fastening patch which can be included to prevent the bolt from disassembling from the bracket device of FIG. 1.
Figure 5A:
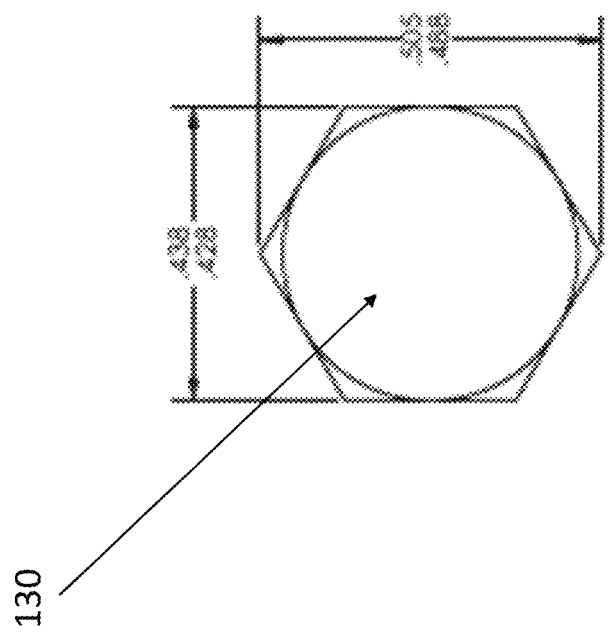
FIG. 5a is a top view of a bolt which can secure drop wire clamps and similar components to the bracket device of FIG. 1.

In this way, a wire or other component of a drop wire clamp system (as shown in FIGS. 6-10) may be inserted into the secondary retention region 230. Once inserted, the wire or component can be secured into the secondary retention region 230 by moving the securing bolt 130 into the closed position. In this position, there could be little to no gap between the end of the securing bolt 130 closest to the support rib 190 and the surface of the support rib 190. It is contemplated, for example and not limitation, that any gap between the securing bolt 130 and support rib 190 when the bolt is in the closed position, is at least less than the diameter of the wire which has been inserted into the secondary retention region 230. Alternatively, the support rib 190 may have a further indentation 200 which is sized to receive the securing bolt 130. In such embodiments, the indentation 200 is located directly under the securing bolt 130, such that as the bolt 130 is moved to the closed position, it enters the indentation 200 and leaves no gap FIGS. 5a and 5b show an enlarged view of an exemplary securing bolt 130. In this exemplary embodiment, the head of the bolt 130 has a hexagonal shape and is sized to be received with a corresponding aperture in a side support 110 or projection 240, though persons of ordinary skill in the art will recognize that other types and shapes of bolt can be used. In addition, the securing bolt 130 may include a fastening patch 131 which can be attached to the securing bolt 130 after it has been inserted into the side support 110 or projection 240. Once attached, the fastening patch 131 can prevent the bolt 130 from being accidently removed from the side support 110 or projection 240. This fastening patch 131 can be composed of various materials, including nylon, so long as the material has the adhesive properties necessary to ensure bonding with the bolt 130.

In addition to retention regions 220, 230, the embodiment disclosed in FIGS. 1-4 may also contain additional support loops 150, 160, 180 to which wires or drop wire clamps may be secured. In certain exemplary embodiments, a first support loop 150 may extend from the base 100 extending away from the structure to which the bracket device 10 can be secured. This support loop 150 may enclose a circular or semicircular area. This first support loop 150 may also be located at various points along the base 100, including a top portion, a middle portion, or a bottom portion.

Figure 9:
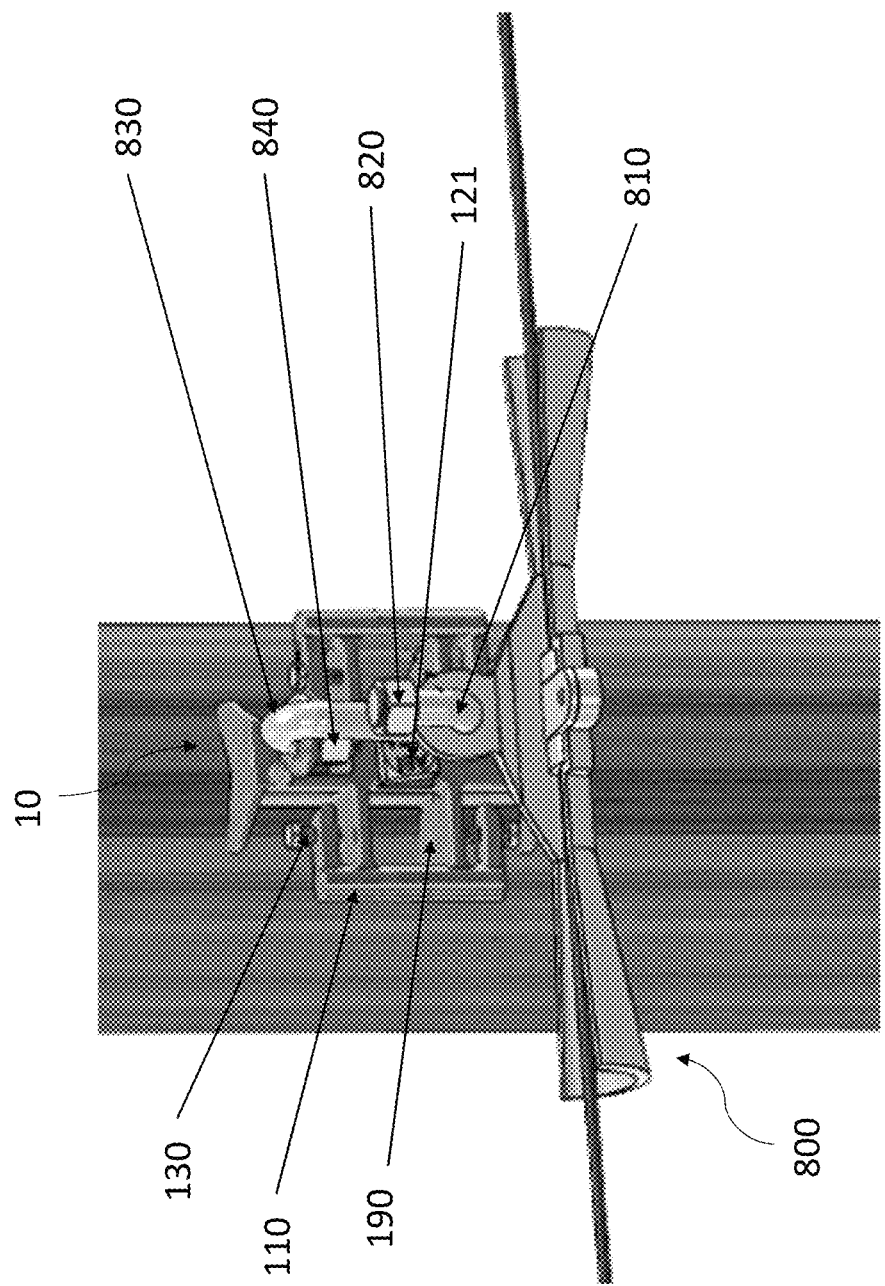
FIG. 9 is a perspective view of the bracket device of FIG. 1 depicted secured to a wooden utility pole with a suspension hook retained by a retention loop of the bracket device.
Figure 10:
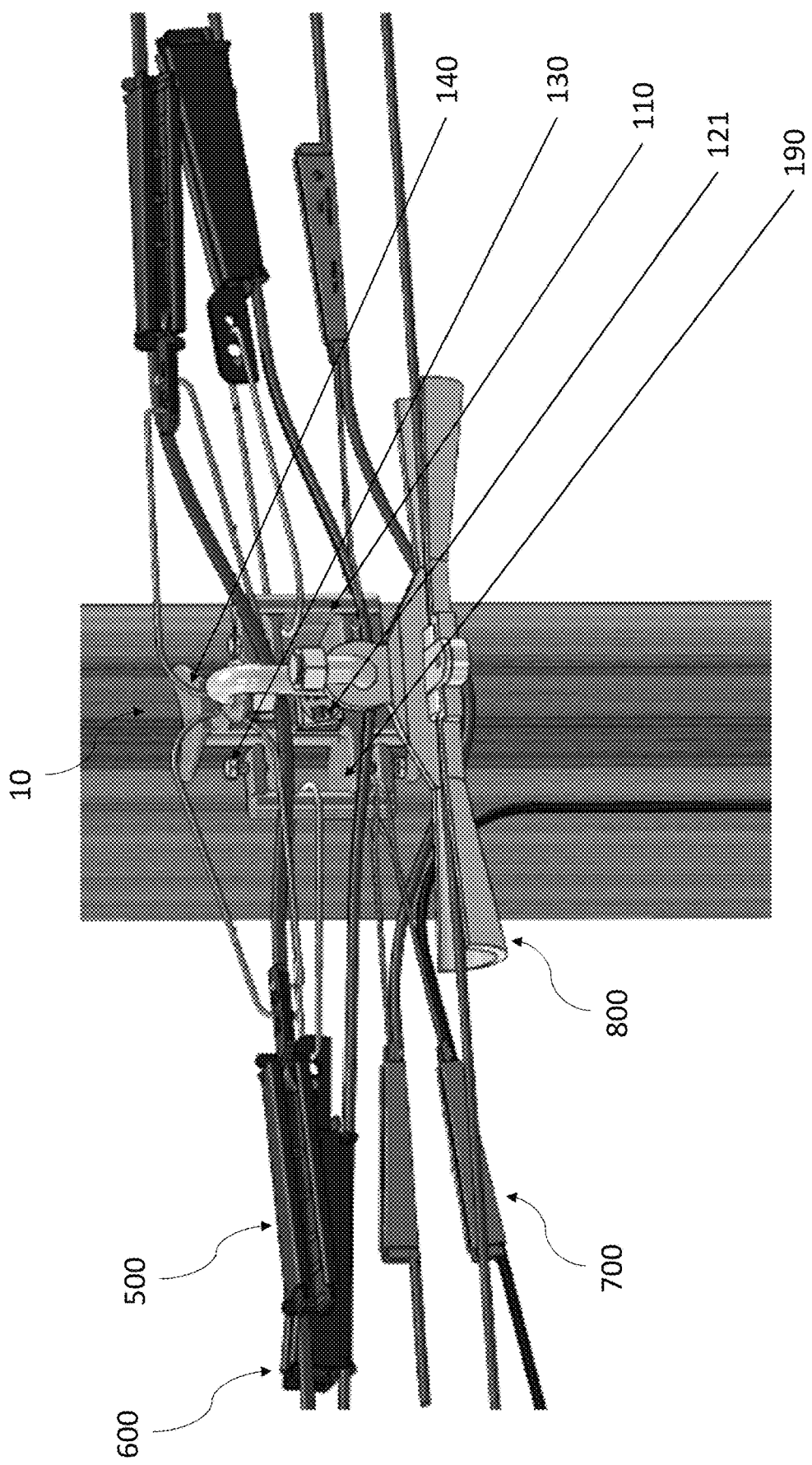
FIG. 10 is a perspective view of the bracket device of FIG. 1 depicted secured to a wooden utility pole with three alternative drop wire clamps secured to the bracket device and a suspension hook retained by a retention loop of the bracket device.

In addition, in certain embodiments, a secondary support loop 180 may extend from the first support loop 150. This secondary support loop 180 may be configured to hold the same wire or drop clamp components as the first support loop 150 or alternative components, for example, a suspension hook system 800, as shown in FIGS. 9 & 10. The bracket device 10 may also include a second support loop 170, extending from a portion of the base 100 away from the first support loop 150.

In addition to the previously discussed components, which may be used primarily to secure wires and drop clamp systems to the bracket device 10, the device may also contain various additional components which may assist with the installation process or provide other useful information. For example, and not limitation, certain embodiments of the disclosed subject matter may include additional frame supports 140, 170 attached to the base 100. A first frame support 140 can be attached to the top portion of the base 100. This frame support 140 can serve multiple purposes, including, but not limited to, preventing the device from rotating once securing to the structure. A second frame support 170 may also be attached to a portion of the base 100 opposite a first frame support 140 and serve similar purposes. Inclusion of one frame support or both are contemplated as being included in embodiments of the disclosed subject matter.

Figure 4:
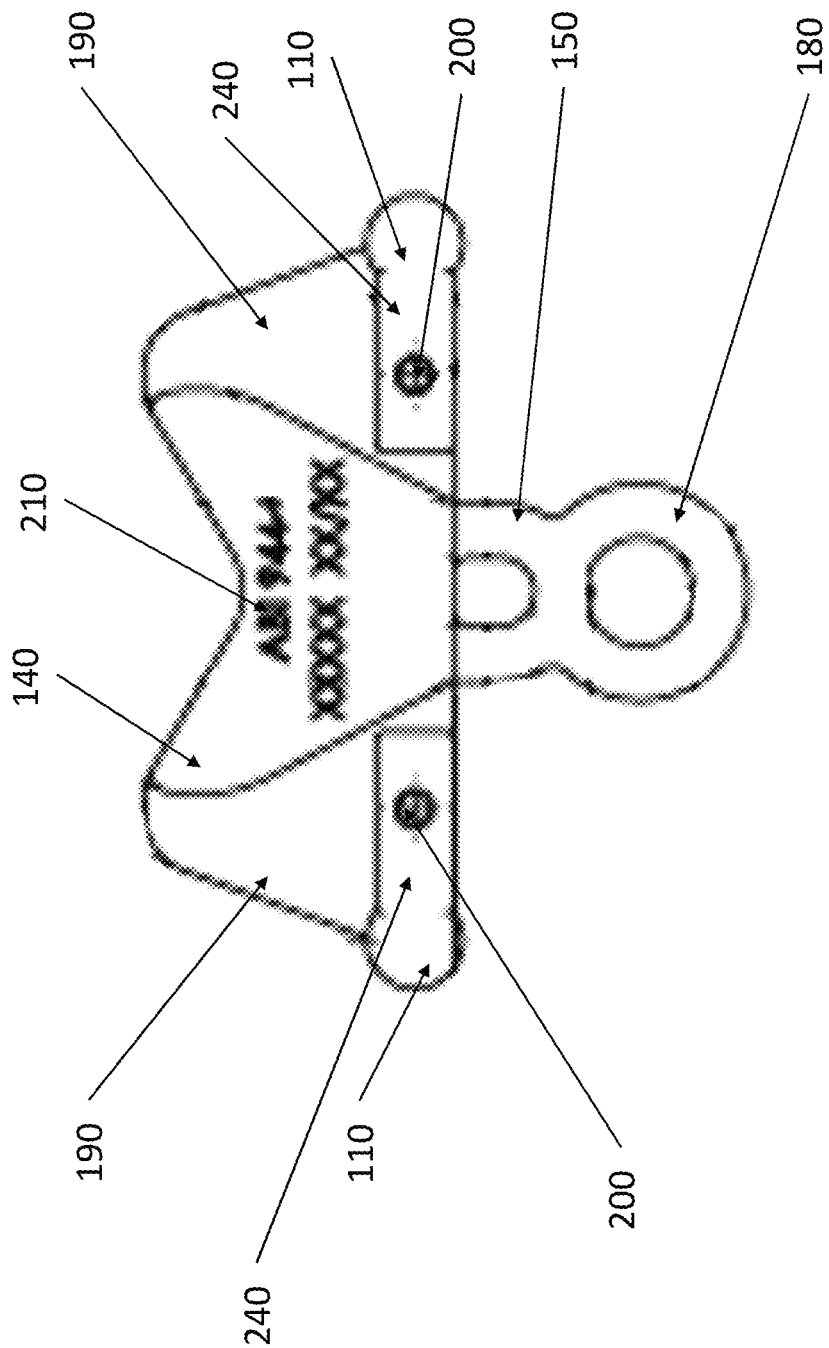
FIG. 4 is a top view of the bracket device of FIG. 1.

Beyond these advantages, the frame supports 140, 170 may also provide a flat surface onto which various identifying information 210 may be imprinted onto the device 10. While the embodiments disclosed in FIGS. 1, 2 & 4 show this identifying information 210 on frame supports 140, such embodiments are not intended to be limiting, and identifying information may be found on other components of the device 10, including but not limited to the support ribs 190 and the side supports 110. As will be understood by those of skill in the art, the material of the base 100 and dimensions of the base 100, as well as other components of the bracket device 10, as discussed above, can be selected to achieve the desired performance.

The below embodiments, illustrated in FIGS. 6-10, discuss at least four systems which can be secured using the disclosed bracket device 10. In certain embodiments, a drop wire clamp system comprises a bail wire having an open loop tail wire, such as those illustrated in FIGS. 6 and 7. In other exemplary embodiments, the bail wire comprises a closed loop tail wire, as illustrated in FIG. 8. In further exemplary embodiments, the bail wire comprises a wire deadend for, for example a wire wrap such as an all dielectric self-supporting ("ADSS") dead-end. In further exemplary embodiments, the bracket device 10 can also support a suspension hook system, as illustrated in FIG. 9.

Figure 6:
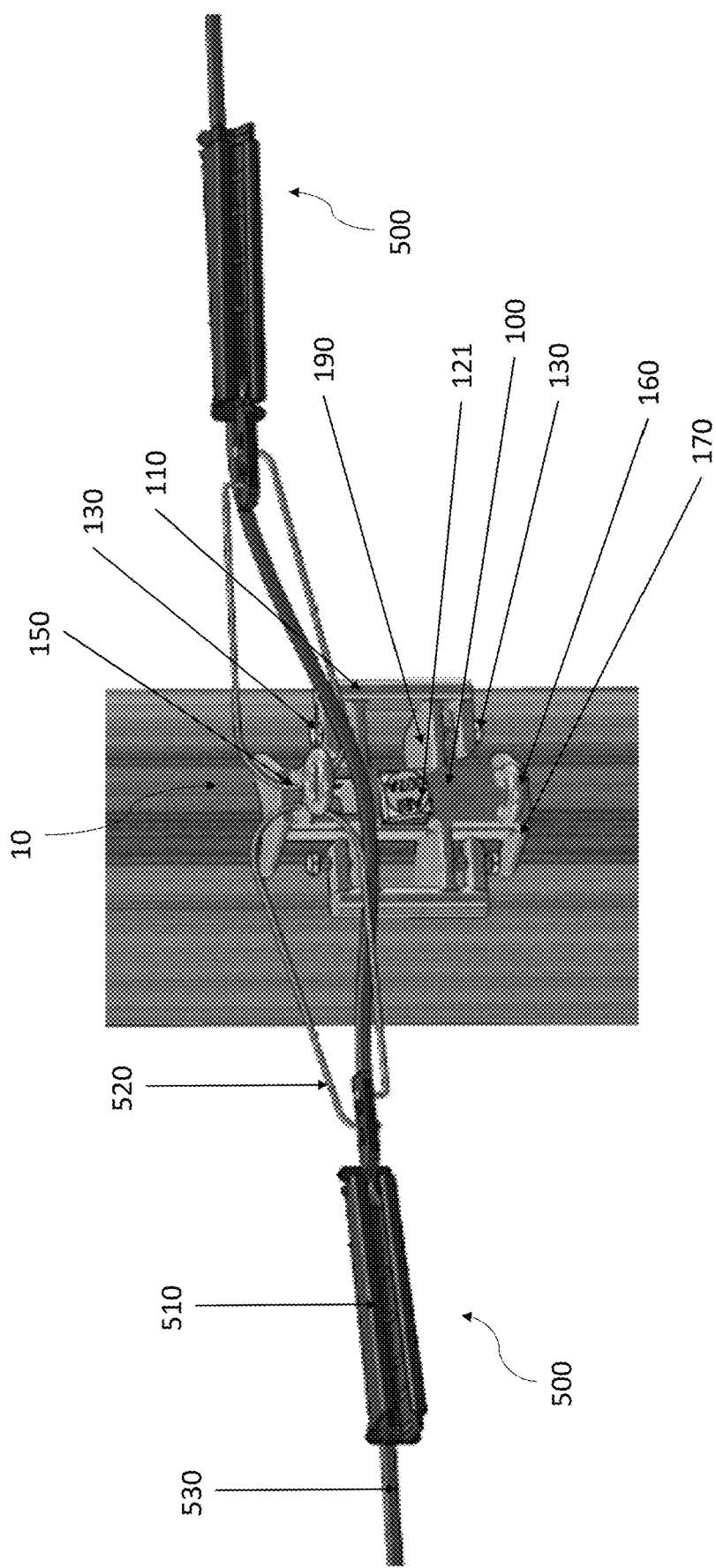
FIG. 6 is a perspective view of the bracket device of FIG. 1 depicted secured to a wooden utility pole with an exemplary drop wire clamp retained by the bracket device.

As discussed above, the disclosed subject matter may be used to secure a wide range of wires and drop clamp systems to various structures, including utility poles and building. FIG. 6, for example, shows a contemplated embodiment RPX drop clamp system 500 secured to a utility pole using the bracket device 10 discussed above. In this embodiment, the bracket device 10 is first secured to the structure by passing a structure securing bolt 121 through the cavity 120 located in the base 100 of the device 10. Once the device 10 has been secured to the structure, the drop clamp system 500 may be secured to the structure. To achieve this, the tail wire 520 of the drop clamp system 500 may be passed through a first support loop 150 and secured to the drop clamp body 510, thus securing the entire RPX drop clamp system 500 to the bracket device 10 and in turn the structure. Multiple tail wires 520, either of the same drop wire system 500 or of different drop wire systems, for example 600, 700, may be secured to a single support loop 150, or alternatively may be secured to other components of the device 10, for example, but not limitation, a second support loop 170, a secondary support loop 180, a retention region 220, and/or a secondary retention region 230. Alternatively, a fastener (not shown) may be passed through the fastening region 195 of the bracket device 10. Such a fastener can be, for example and not limitation, in the form of a band, a wire, or a cable tie. The fastener can pass through the fastening region 195 of the bracket device and around the utility pole or similar structure, which secures the bracket device in place.

Figure 7:
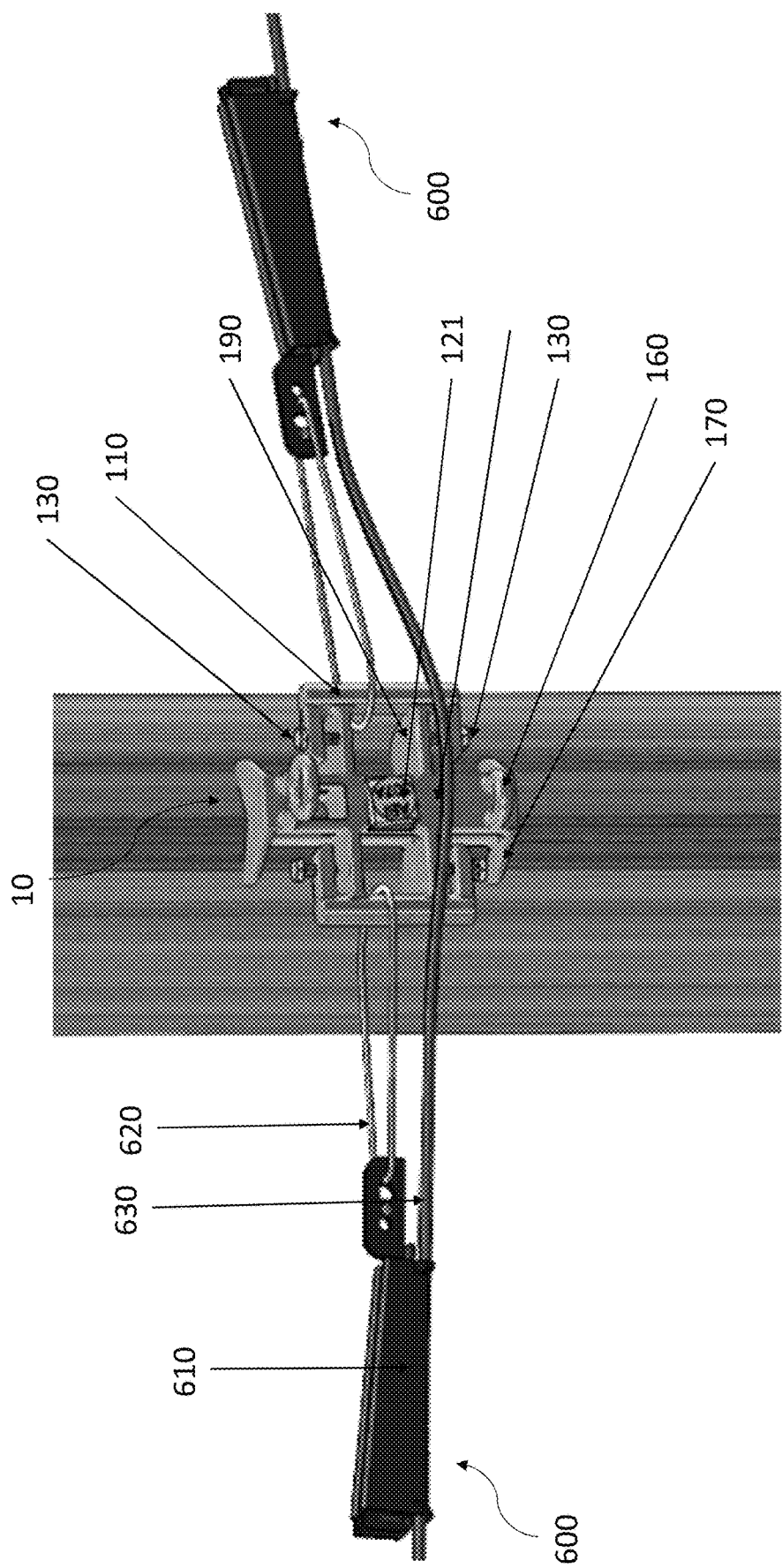
FIG. 7 is a perspective view of the bracket device of FIG. 1 depicted secured to a wooden utility pole with an alternative exemplary drop wire clamp retained by the bracket device.
Figure 8:
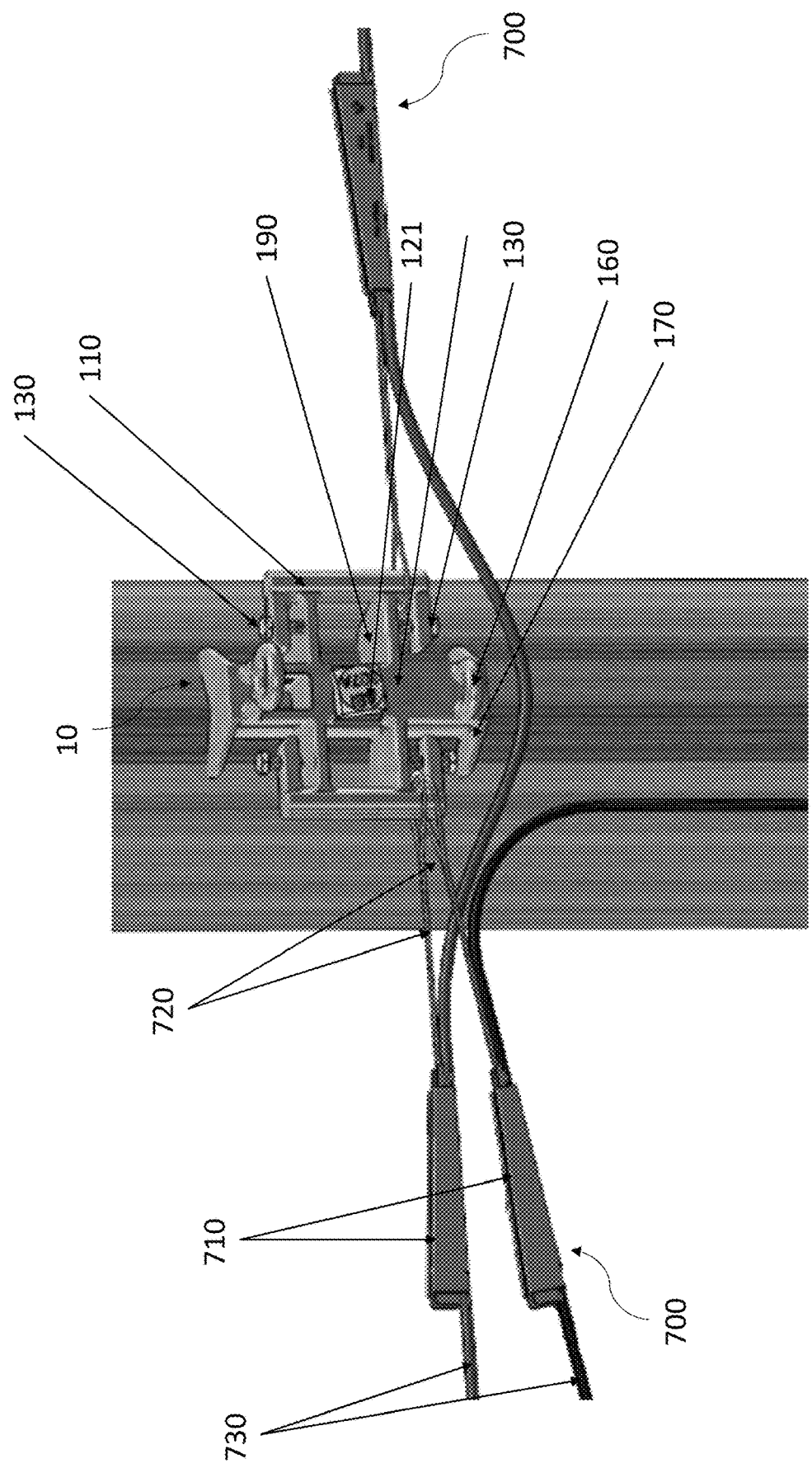
FIG. 8 is a perspective view of the bracket device of FIG. 1 depicted secured to a wooden utility pole with an alternative exemplary drop wire clamp retained by the bracket device.

As a further example, for the purpose of illustration and not limitation, FIG. 7 shows an exemplary super drop clamp system 600 secured to the bracket device 10. In this embodiment, the bracket device 10 is first secured to the utility pole by passing a structure securing bolt 121 through the cavity 120 located in the base of the device 10. Once the device has been secured to the structure, the super drop clamp system 600 may be secured to the structure. To achieve this, the tail wire 620 may be passed through a retention region 220 of the bracket device 10, and secured to the drop clamp body 610, thus securing the entire super drop clamp 600 to the bracket device 10 and in turn the structure. Multiple tail wires 620 may be secured to a single retention region 220, or alternatively may be secured to other components of the bracket device 10, for example, but not limitation, a secondary retention region 230, one or more support loops 150, 170, or a secondary support loop 180.

As a further example, for the purpose of illustration and not limitation, FIG. 8 shows an exemplary universal three piece fiber drop clamp system 700. In this embodiment, the bracket device 10 is first secured to the structure by passing a structure securing bolt 121 through the cavity 120 located in the base of the device 10. Once the device 10 has been secured to the structure, the drop clamp system 700 may be secured to the structure. To achieve this, a closed loop tail wire 720 can inserted into the secondary retention region 230 of the bracket device 10, and the securing bolt 130 moved into the closed position. Multiple tail wires 810 may be inserted into alternative secondary retention regions 230 of the bracket device 10, or the same secondary retention region 230. Alternatively, an open loop tail wire, e.g. 520 and 620, can be inserted into the secondary retention region 230 and securing using the securing bolt 130 as described above.

As a further example, FIG. 9 shows an exemplary suspension hook system 800. In this embodiment, the bracket device 10 is first secured to the structure by passing a structure securing bolt 121 through the cavity 120 located in the base of the device 10. Once the device has been secured to the structure, the suspension hook system 800 may be secured to the structure. To achieve this, a mounting arm 830 of the suspension hook system 800 may be inserted into a secondary support loop 180 of the bracket device 10. Once a sufficient portion of the mounting arm 830 is passed through the secondary support loop 180, a mount securing nut 840 may be attached to the mounting arm 830 and moved into a locked position. In certain embodiments, the mount securing nut 840 has a greater diameter than the secondary support loop 180, such that once the nut 840 is in the closed position, the mounting arm 830 cannot be removed from the secondary support loop. Once secured, additional components may be attached to the suspension hook system 800, including a wire, or attached to a separate suspension hook 820 and secured using a hook securing nut 820.

None of the above listed embodiments are exclusive. Rather, as shown in FIG. 10, the bracket device 10 discussed above can be used to secure multiple wires and drop clamp systems simultaneously. For example, and as according to the exemplary embodiments discussed above, a single bracket device 10 can secure each of an RPX drop clamp system 500, a super drop clamp system 600, a universal three piece fiber drop clamp system 700, and a suspension hook system 800 at the same time without impeding the functionality of the bracket, or any connected drop clamp system. Additionally, further wires and drop clamp systems are contemplated (but not shown) which are compatible with the disclosed subject matter. These include, but are not limited to fiber optic cables, all-dielectric self-supporting cables, black fiber drop clamps and CATV drop wire clamps.

Persons of ordinary skill in the art will recognize further systems which are compatible with the disclosed subject matter discussed above and illustrated in the figures.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed. It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A bracket device to secure a plurality of tail wires of one or more drop wire clamps and/or wire deadends to a structure comprising:
   a bracket base having a surface and a cavity;
   one or more support ribs extending perpendicularly from a side of the bracket base;
   one or more side supports secured to one or more support ribs and, with the one or more support ribs, defining one or more retention regions along the side of the bracket base;
   a plurality of securing bolts cooperatively coupled to the one or more side supports and, with the one or more side supports and the one or more support ribs, defining a secondary retention regions, wherein the plurality of securing bolts are configured to move between an open position to permit a tail wire or a wire deadend to enter or exit the one or more secondary retention regions and a closed position wherein the wire is retained within the secondary retention region;
   a first support loop extending from a first portion of the bracket base;
   wherein the bracket device is configured to be secured to a structure with a single fastening component.

2. The bracket device of claim 1, wherein one or more of the support ribs contains an indentation configured to receive at least one securing bolt when the securing bolt is in the closed position.

3. The bracket device of claim 1, wherein the single fastening component comprises a securing bolt which passes through the cavity and the structure comprises a wooden utility pole.

4. The bracket device of claim 1, wherein the single fastening component comprises a band, which passes through a fastening region and the structure comprises either a concrete utility pole or a fiberglass utility pole.

5. The bracket device of claim 1, further comprising a frame support, attached to either the top or the bottom of the bracket base and which contains identifying information related to the bracket device.

6. The bracket device of claim 1, wherein each of the plurality of securing bolts further comprise a fastening patch which prevents the securing bolts from uncoupling with the side support to which each is cooperatively coupled.

7. The bracket device of claim 1, further comprising a second support loop extending from a second portion of the bracket device.

8. The bracket device of claim 1, further comprising a secondary support loop, extending from the first support loop, wherein the secondary support loop is configured to receive a suspension hook.

9. The bracket device of claim 1, wherein the one or more support ribs, the one or more side supports, and the plurality of securing bolts define two retention regions and four secondary retention regions.

10. A method for securing a plurality of tail wires and/or wire deadends to a bracket device comprising:
  coupling a first tail wire or a first wire deadend with a retention region of the bracket device, wherein the retention region comprises a region defined by a plurality of support ribs extending perpendicular from a base region of the bracket device and a side support attached to one or more of the plurality of support ribs;
  coupling one or more subsequent tail wires or deadends with either the retention region or a secondary retention region; and
  transitioning at least one securing bolt to a closed position to retain the subsequent wires or deadends in the secondary retention region.

11. The method of claim 10, wherein the retention region of the bracket device comprises a support loop extending from a top portion of the bracket device.

12. The method of claim 10, wherein the first tail wire comprises a super drop clamp device.

13. The method of claim 10, wherein the first tail wire comprises a super drop clamp device.

14. The method of claim 10, wherein the retention region is further defined by a securing bolt which passes through the side support, further comprising:
  transitioning the securing bolt from an open position to a closed position to retain the tail wire in the retention region.

15. The method of claim 14, wherein the first tail wire comprises a universal three piece fiber drop clamp.

16. The method of claim 10, wherein the retention region comprises a support loop extending from a top portion of the bracket device.

17. The method of claim 16, further comprising:
  inserting a suspension hook having a mounting arm into the support loop;
  coupling a locking nut onto the mounting arm;
  transitioning the locking nut from an unlocked position to a locked position to retain the mounting arm in the support loop; and
  coupling a wire to the suspension hook.

18. The method of claim 16, wherein the first tail wire comprises an RPX drop clamp device.

19. The method of claim 10, wherein the first tail wire is selected from the group consisting of an RPX drop clamp device, a super drop clamp device, and a universal three piece fiber drop clamp device.

\* \* \* \* \*